United States Patent
Uematsu et al.

[19]

[11] Patent Number: 5,809,768
[45] Date of Patent: Sep. 22, 1998

[54] HYDROGEN-OXYGEN COMBUSTION TURBINE PLANT

[75] Inventors: Kazuo Uematsu; Hidetaka Mori; Hideaki Sugishita, all of Takasago, Japan

[73] Assignee: Mitsubishi Heavy Industries, Ltd., Tokyo, Japan

[21] Appl. No.: 833,690

[22] Filed: Apr. 8, 1997

[51] Int. Cl.$^6$ .................................................. F03C 3/22
[52] U.S. Cl. ...................... 60/39.465; 60/39.52; 60/39.53
[58] Field of Search .............. 60/39.161, 39.17, 60/39.182, 39.465, 39.52, 39.53, 39.55, 728

[56] References Cited

U.S. PATENT DOCUMENTS

| | | | |
|---|---|---|---|
| 4,148,185 | 4/1979 | Somers | 60/39.17 |
| 5,331,806 | 7/1994 | Warkentin | 60/39.465 |
| 5,644,911 | 7/1997 | Huber | 60/39.05 |
| 5,687,559 | 11/1997 | Sato | 60/39.182 |

*Primary Examiner*—Louis J. Casaregola
*Attorney, Agent, or Firm*—Wenderoth, Lind & Ponack, L.L.P.

[57] ABSTRACT

A hydrogen-oxygen combustion turbine plant having an improved thermal efficiency and capable of being designed in a flexible manner. The plant is constructed as follows. A compressor is divided into a plurality of units (1A and 1B), a water injection device (14) is disposed between the compressor units, and exhaust water from a condenser (10) of a second turbine (6) is utilized as a water supply. A gas turbine is also divided into a plurality of units (3A to 3C) with multiple axes. Further, not only extracted steam (9A and 9B) from the compressors (1A and 1B) but also the extracted steam (12A and 12B) from the second turbine (6) and the extracted steam (13A and 13B) from the exhaust of the third turbine (8) are used as cooled steam for gas turbines (3A to 3C) and the combustion chamber (2).

4 Claims, 3 Drawing Sheets

HYDROGEN-OXYGEN COMBUSTION TURBINE PLANT

FIELD OF THE INVENTION

The present invention relates to improvements in a hydrogen-oxygen combustion turbine plant and to a cooled steam extraction structure in a hydrogen-oxygen combustion gas turbine.

PRIOR ART

FIG. 3 is a schematic diagram showing an example of a conventional hydrogen-oxygen combustion turbine plant.

Hydrogen, oxygen and gas turbine exhaust steam compressed by a compressor (1) is supplied to and mixed in a combustion chamber (2). The supplied steam is then combusted to make high-temperature combustion steam for driving a gas turbine (3). After this exhaust steam is subjected to heat recovery by heat exchangers (4) and (5) on the downstream side of the gas turbine (3), it is fed back to the compressor (1). Also, part of the exhaust steam is extracted from a communicating pipe between the heat exchangers (4) and (5) to drive a second turbine (6). The exhaust of this second turbine (6) is condensed by a condenser (10), heated by a heat exchanger (7) provided in the pipe line, heated again by the heat exchangers (5) and (4) to become low-temperature, low-pressure steam, and after driving a third turbine (8), returns to the inlet side of the combustion chamber (2). Reference numeral (11) indicates a feed water booster pump.

The cooled steam and seal steam for the turbine blades and discs of the gas turbine (3) are extracted from the compressor (1) by a cooled steam pipe (9) and supplied to the gas turbine (3).

The cycle of the conventional hydrogen-oxygen combustion turbine plant described above is strictly conceptual, and where the pressure ratio of the compressor is high, such cycle cannot be realized with a single compressor from the structural point of view. This problem also applies to gas turbines.

Also, utilization of the compressed steam from the compressor as the cooled steam and seal steam for the turbine blades and discs, as in the case of a conventional gas turbine leads to the use of high-energy compressed steam for cooling and sealing, which results in a great loss.

SUMMARY OF THE INVENTION

The inventors of the present invention, in order to solve the problem involved in conventional gas turbine, have provided the hydrogen-oxygen combustion turbine plant described in the following items 1 through 4.

1) A hydrogen-oxygen combustion turbine plant comprising a compressor, a gas turbine device including a hydrogen-oxygen combustion chamber and a gas turbine, a first heat exchanger for recovering heat from the exhaust of the gas turbine, a second heat exchanger for further recovering heat from part of the gas turbine exhaust exiting the first heat exchanger, a pipe line for returning the gas turbine exhaust exiting the second heat exchanger to an inlet of the compressor, a second turbine driven by the remainder of the gas turbine exhaust exiting the first heat exchanger, and a third turbine driven by steam obtained by sequentially heating, by means of the second and first heat exchangers, a condensate from the second turbine and whose exhaust is returned to the hydrogen-oxygen combustion chamber, wherein the compressor and gas turbine are each divided into a plurality of units, a water injection device having the condensate of the second turbine as its water supply is provided between the divided compressors, and the axes of rotation of the divided gas turbines differ from each other.

2) In addition to the structure of Item 1, steam extracted from the compressor and/or second turbine is used as the cooled steam for the gas turbine.

3) In addition to the structure of Item 1, steam extracted from the third turbine is used as the cooled steam for the gas turbine.

4) In addition to the structure of Item 1, steam extracted from the third turbine is used as recovery-type cooled steam for the turbines and/or the combustion chamber.

In the means described in Item 1, where the pressure ratio is high, since the number of revolutions can be optimally selected by making the compressor a divided type and allowing the divided gas turbine units to have a number of axes (i.e. dividing the gas turbine into a plurality of units with different axes of rotation) so that not only the efficiency can be improved but also, the problems of avoiding the surging of the compressor and axial vibration of the turbines and the control of the lowering performance (generation of shock waves) caused by the peripheral speed of the impellers and the flow speed of the steam can be solved with ease.

Also in the means described in Item 1, since a water injection device is provided between the divided compressors, the steam whose temperature has been reduced by compression can be effectively cooled, the temperature at which it flows into the compressor at the next stage can be reduced, and the structural design can be improved. Also, since the condensate of the second turbine is used as the water supply thereof, loss can be kept to a minimum and the labor and cost involved in preparing a special water supply can be saved.

Since the steam extracted from the second turbine in the above Item 2, and the exhaust of the third turbine in the above Item 3, are utilized as the cooled steam for the gas turbine, fine temperature and pressure cooled steam can be supplied. Also, since the steam from the second and third turbines is steam whose work has already been finished in the turbines, it has great advantages as far as the efficiency is concerned.

In addition, where the cooled steam is exhausted into the main flow, a large amount is lost, but in Item 4, since the steam extracted from the exhaust of the third turbine is recovered after cooling the gas turbine and/or the combustion chamber and not exhausted into the main flow, efficiency is improved.

BRIEF DESCRIPTION OF THE DRAWINGS

These and other features, aspects and advantages of the present invention will become better understood with reference to the following description, appended claims and accompanying drawings, wherein:

DETAILED DESCRIPTION OF THE INVENTION

Figure 1:
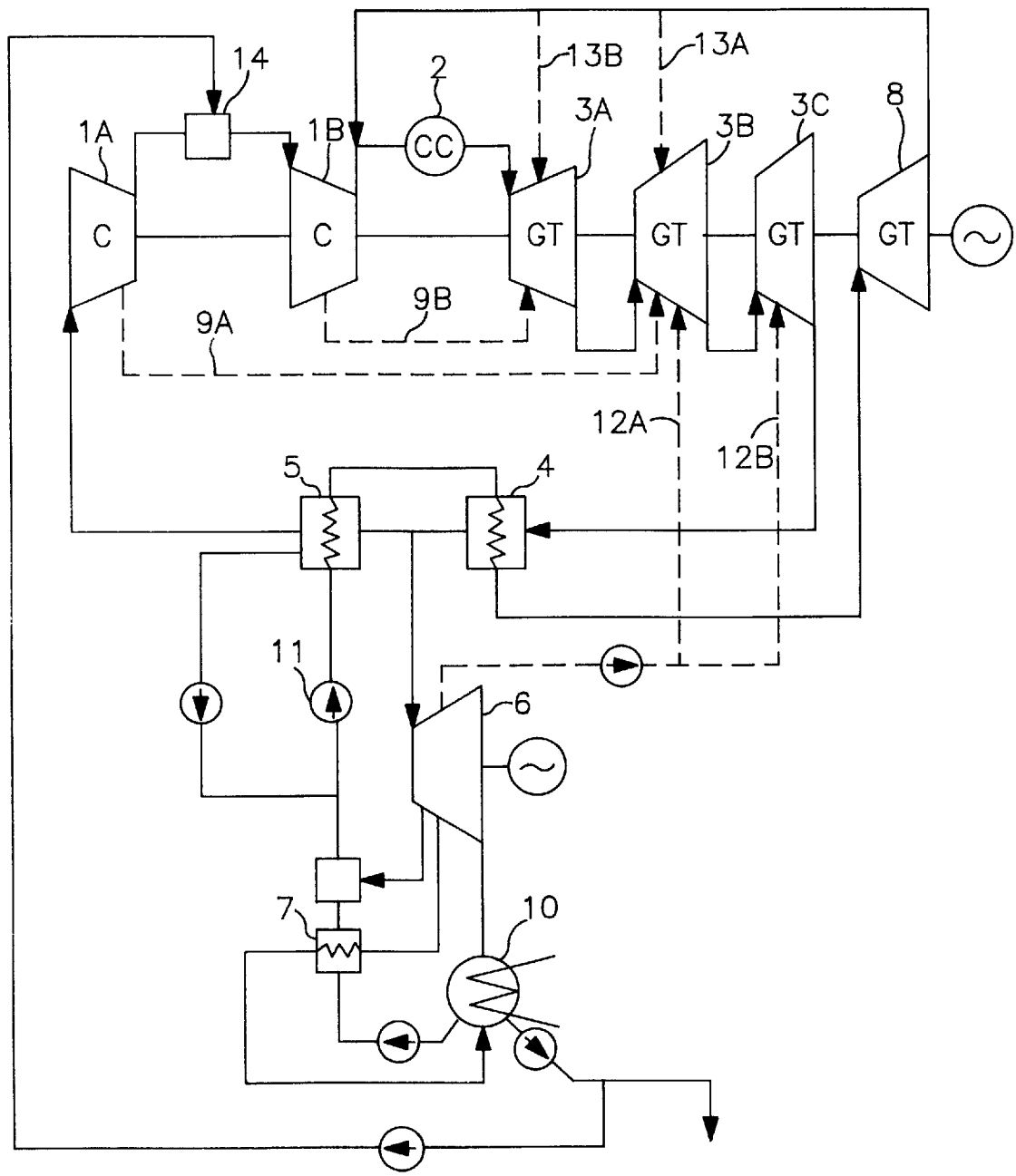
FIG. 1 is a schematic diagram illustrating a first embodiment of the present invention.
Figure 3:
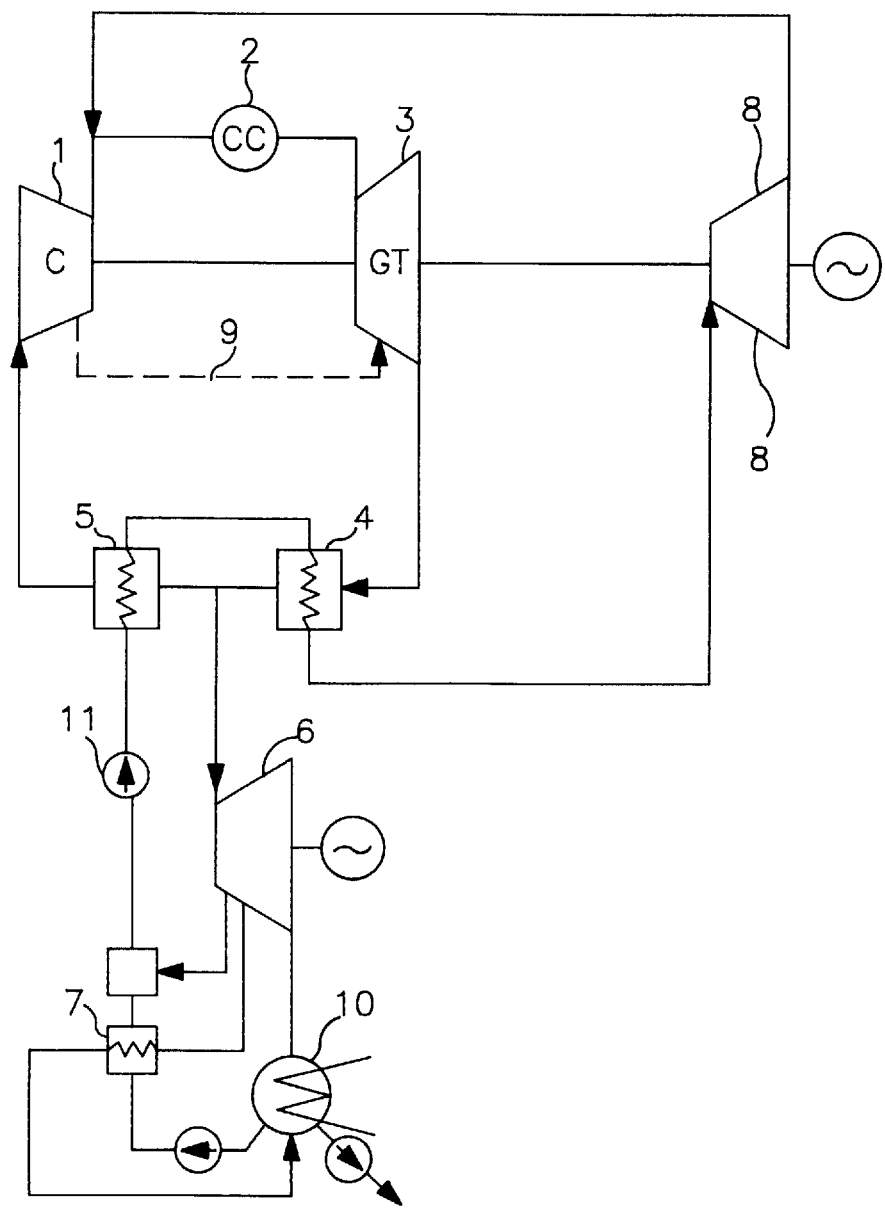
FIG. 3 is a schematic diagram illustrating an example of a conventional hydrogen-oxygen combustion turbine plant.

In FIG. 1, in order to avoid repetition concerning those portions that are the same as those in the prior art described with regard to the above FIG. 3, the same reference numerals will be used and detailed explanation thereof will be omitted.

In the present embodiment, the compressor is divided into a plurality of compressor units (1A) and (1B), with a water injection device (14) disposed between these compressor units (1A) and (1B). As the water supply of this water injection device (14), the water exhausted from a condenser (10) of a second turbine (6) is utilized, so that loss is kept to a minimum. Also, the gas turbine is constructed as multi-axial gas turbines (3A), (3B) and (3C).

As well as the cooled steam of the blades and discs etc. of the gas turbines (3A), (3B) and (3C) being supplied by cooled steam pipes (9A) and (9B) from the compressors (1A) and (1B), extracted steam from the second turbine (6) is supplied by the cooled steam pipes (12A) and (12B). Further, extracted steam from the exhaust of the third turbine (8) is supplied by cooled steam pipes (13A) and (13B).

Figure 2:
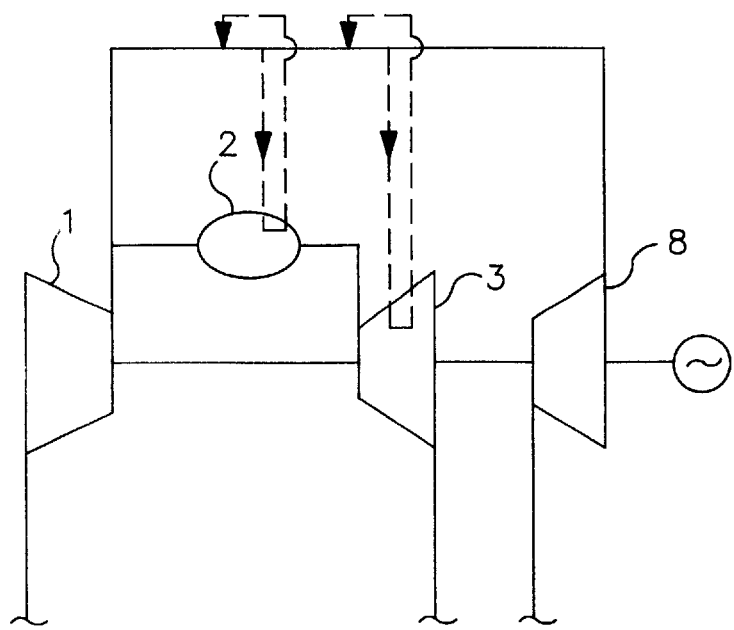
FIG. 2 is a schematic diagram illustrating a second embodiment of the present invention.

FIG. 2 illustrates a second embodiment of the present invention, and is a schematic diagram showing a case where cooled steam is recovered. In this diagram, the same reference numerals are used for those portions described above and detailed explanation thereof are omitted.

In the present embodiment, the cooled steam of the gas turbine (3) and the combustion chamber (2) is extracted from a line which recovers the exhaust of the third turbine (8) for the combustion chamber (2) and used, and each portion of cooled steam, after cooling the blades of the gas turbine (3) and the transition pipe etc. of the combustion chamber (2), is returned to the line and recovered.

According to the present invention, not only is the heat loss of a hydrogen-oxygen combustion turbine plant reduced and efficiency improved, but also a minute structural design is made possible to hereby easily prevent the generation of compressor surging, axial turbine vibration, shock waves, etc.

What is claimed is:

1. A hydrogen-oxygen combustion turbine plant comprising a compressor, a gas turbine device including a hydrogen-oxygen combustion chamber and a gas turbine, a first heat exchanger for recovering heat from exhaust of the gas turbine, a second heat exchanger for further recovering heat from part of gas turbine exhaust exiting the first heat exchanger, a pipe line for returning gas turbine exhaust exiting the second heat exchanger to an inlet of the compressor, a second turbine driven by the remainder of the gas turbine exhaust exiting the first heat exchanger, and a third turbine driven by steam obtained by sequentially heating, by means of the second and first heat exchangers, a condensate from the second turbine and whose exhaust is returned to the hydrogen-oxygen combustion chamber, wherein the compressor and gas turbine are each divided into a plurality units, a water injection device having the condensate of the second turbine as its water supply is provided between the divided compressor units, and the divided gas turbine units have different axes of rotation, respectively.

2. The hydrogen-oxygen combustion turbine plant of claim 1, wherein steam extracted from the compressor and/or second turbine is used for cooling the gas turbine.

3. The hydrogen-oxygen combustion turbine plant of claim 1, wherein steam extracted from the third turbine is used for cooling the gas turbine.

4. The hydrogen-oxygen combustion turbine plant of claim 1, wherein steam extracted from the third turbine is used as recovery-type cooled steam for cooling the turbine and/or the combustion chamber.

* * * * *